(12) United States Patent
Calderbank et al.

(10) Patent No.: US 6,430,231 B1
(45) Date of Patent: Aug. 6, 2002

(54) GENERALIZED ORTHOGONAL DESIGNS FOR SPACE-TIME CODES FOR WIRELESS COMMUNICATION

(75) Inventors: Arthur R. Calderbank, Princeton; Hamid Jafarkhani, Middletown; Ayman F. Naguib, New Providence; Nambirajan Seshadri, Chatham; Vahid Tarokh, Madison, all of NJ (US)

(73) Assignee: AT&T Corp., Basking Ridge, NJ (US)

( * ) Notice: Subject to any disclaimer, the term of this patent is extended or adjusted under 35 U.S.C. 154(b) by 0 days.

(21) Appl. No.: 09/186,908

(22) Filed: Nov. 6, 1998

Related U.S. Application Data

(60) Provisional application No. 60/076,613, filed on Mar. 3, 1998, and provisional application No. 60/065,095, filed on Nov. 11, 1997.

(51) Int. Cl.[7] ............................ H04L 27/28; H04L 27/26
(52) U.S. Cl. ...................................... 375/295; 375/260
(58) Field of Search .................................. 375/146, 231, 375/232, 295, 296, 267, 299, 298, 260

(56) References Cited

U.S. PATENT DOCUMENTS 6,185,258 B1 * 2/2001 Alamouti et al. ........... 375/260

* cited by examiner

Primary Examiner—Chi Pham
Assistant Examiner—Dung X Nguyen
(74) Attorney, Agent, or Firm—Henry T. Brendzel

(57) ABSTRACT

It is possible to realize a transmitter where a block of n symbols is encoded through an n×n matrix and transmitted over n antennas in n time intervals, only for n=2, 4, or 8. For all other numbers of antennas, the disclosed methodology permits the realization of full-rate rectangular designs, where the number of time intervals, p, is greater than n. In particular, the number of time intervals, p, is such that $\rho(p) \geq n$, where $\rho(p) = 8c + 2^d$, where c and d are such that $p = b \cdot 2^{4c+d}$, and b is an odd integer. Complex symbols can also be handled, but the rate for a design that allows use of any number of antennas is 0.5.

25 Claims, 1 Drawing Sheet

GENERALIZED ORTHOGONAL DESIGNS FOR SPACE-TIME CODES FOR WIRELESS COMMUNICATION

REFERENCE TO RELATED APPLICATIONS

This application claims the benefit of U.S. Provisional Application No. 60/065,095, filed Nov. 11, 1997; and of U.S. Provisional Application No. 60/076,613, filed Mar. 3, 1998.

BACKGROUND OF THE INVENTION

This invention relates to wireless communication and, more particularly, to techniques for effective wireless communication in the presence of fading and other degradations.

The most effective technique for mitigating multipath fading in a wireless radio channel is to cancel the effect of fading at the transmitter by controlling the transmitter's power. That is, if the channel conditions are known at the transmitter (on one side of the link), then the transmitter can pre-distort the signal to overcome the effect of the channel at the receiver (on the other side). However, there are two fundamental problems with this approach. The first problem is the transmitter's dynamic range. For the transmitter to overcome an xdB fade, it must increase its power by xdB which, in most cases, is not practical because of radiation power limitations, and the size and cost of amplifiers. The second problem is that the transmitter does not have any knowledge of the channel as seen by the receiver (except for time division duplex systems, where the transmitter receives power from a known other transmitter over the same channel). Therefore, if one wants to. control a transmitter based on channel characteristics, channel information has to be sent from the receiver to the transmitter, which results in throughput degradation and added complexity to both the transmitter and the receiver.

Other effective techniques are time and frequency diversity. Using time interleaving together with coding can provide diversity improvement. The same holds for frequency hopping and spread spectrum. However, time interleaving results in unnecessarily large delays when the channel is slowly varying. Equivalently, frequency diversity techniques are ineffective when the coherence bandwidth of the channel is large (small delay spread).

It is well known that in most scattering environments antenna diversity is the most practical and effective technique for reducing the effect of multipath fading. The classical approach to antenna diversity is to use multiple antennas at the receiver and perform combining (or selection) to improve the quality of the received signal.

The major problem with using the receiver diversity approach in current wireless communication systems, such as IS-136 and GSM, is the cost, size and power consumption constraints of the receivers. For obvious reasons, small size, weight and cost are paramount. The addition of multiple antennas and RF chains (or selection and switching circuits) in receivers is presently not be feasible. As a result, diversity techniques have often been applied only to improve the up-link (receiver to base) transmission quality with multiple antennas (and receivers) at the base station. Since a base station often serves thousands of receivers, it is more economical to add equipment to base stations rather than the receivers Recently, some interestingapproaches for transmitter diversity have been suggested. A delay diversity scheme was proposed by A. Wittneben in "Base Station Modulation Diversity for Digital SIMULCAST," Proceeding of the 1991 IEEE Vehicular Technology Conference (VTC 41 st), PP. 848–853, May 1991, and in "A New Bandwidth Efficient Transmit Antenna Modulation Diversity Scheme For Linear Digital Modulation," in Proceeding of the 1993 IEEE International Conference on Communications (IICC '93), PP. 1630–1634, May 1993. The proposal is for a base station to transmit a sequence of symbols through one antenna, and the same sequence of symbols—but delayed—through another antenna.

U.S. Pat. No. 5,479,448, issued to Nambirajan Seshadri on Dec. 26, 1995, discloses a similar arrangement where a sequence of codes is transmitted through two antennas. The sequence of codes is routed through a cycling switch that directs each code to the various antennas, in succession. Since copies of the same symbol are transmitted through multiple antennas at different times, both space and time diversity are achieved. A maximum likelihood sequence estimator (MLSE) or a minimum mean squared error (MMSE) equalizer is then used to resolve multipath distortion and provide diversity gain. See also N. Seshadri, J. H. Winters, "Two Signaling Schemes for Improving the Error Performance of FDD Transmission Systems Using Transmitter Antenna Diversity," *Proceeding of the* 1993 *IEEE Vehicular Technology Conference* (VTC 43rd), pp. 508–511, May 1993; and J. H. Winters, "The Diversity Gain of Transmit Diversity in Wireless Systems with Rayleigh Fading," *Proceeding of the* 1994 *ICC/SUPERCOMM*, New Orleans, Vol. 2, PP. 1121–1125, May 1994.

Still another interesting approach is disclosed by Tarokh, Seshadri, Calderbank and Naguib in U.S. application, Ser. No. 08/847635, filed Apr. 25, 1997 (based on a provisional application filed Nov. 7, 1996), where symbols are encoded according to the antennas through which they are simultaneously transmitted, and are decoded using a maximum likelihood decoder. More specifically, the process at the transmitter handles the information in blocks of M1 bits, where M1 is a multiple of M2, i.e., M1=k*M2. It converts each successive group of M2 bits into information symbols (generating thereby k information symbols), encodes each sequence of k information symbols into n channel codes (developing thereby a group of n channel codes for each sequence of k information symbols), and applies each code of a group of codes to a different antenna.

Recently, a powerful approach is disclosed by Alamouti et al in U.S. patent application Ser. No. 09/074,224, filed May 5, 1998, and titled "Transmitter Diversity Technique for Wireless Communication". This disclosure revealed that an arrangement with two transmitter antennas can be realized that provides diversity with bandwidth efficiency, easy decoding at the receiver (merely linear processing), and performance that is the same as the performance of maximum ratio combining arrangements. In this arrangement the constellation has four symbols, and a frame has two time slots during which two bits arrive. Those bit are encoded so that in a first time slot symbol $c_1$ and $c_2$ are sent by the first and second antennas, respectively, and in a second time slot symbols—$c_2^*$ and $c_1^*$ are sent by the first and second antennas, respectively. Accordingly, this can be expressed by an equation of the form r=Hc+n, where r is a vector of signals received in the two time slots, c is a vector of symbols $c_1$ and $c_2$, n is a vector of received noise signals in the two time slots, and H is an orthogonal matrix that reflects the above-described constellation of symbols.

The good performance of this disclosed approach forms an impetus for finding other systems, with a larger number of transmit antennas, that has equally good performance.

SUMMARY

The prior art teachings for encoding signals and transmitting them over a plurality of antennas are advanced by disclosing a method for encoding for any number of transmitting antennas. It is demonstrated that for square designs, where a block of n real symbols is permuted n times (with some sign reversals), and at each time interval the permuted block of n symbols is respectively transmitted over the n antennas, a design can be realized only for n=2, 4, or 8. For all other numbers of antennas, the disclosed methodology permits the realization of full-rate rectangular designs, where the number of time intervals, p, is greater than n. In particular, the number of time intervals, p, is such that $\rho(p) \geq n$, where $\rho(p) = 8c + 2^d$, where c and d are such that $p = b \cdot 2^{4c+d}$, and b is an odd integer. Complex symbols can also be handled, but the rate for a design that allows use of any number of antennas is 0.5.

DETAIL DESCRIPTION

Figure 1:
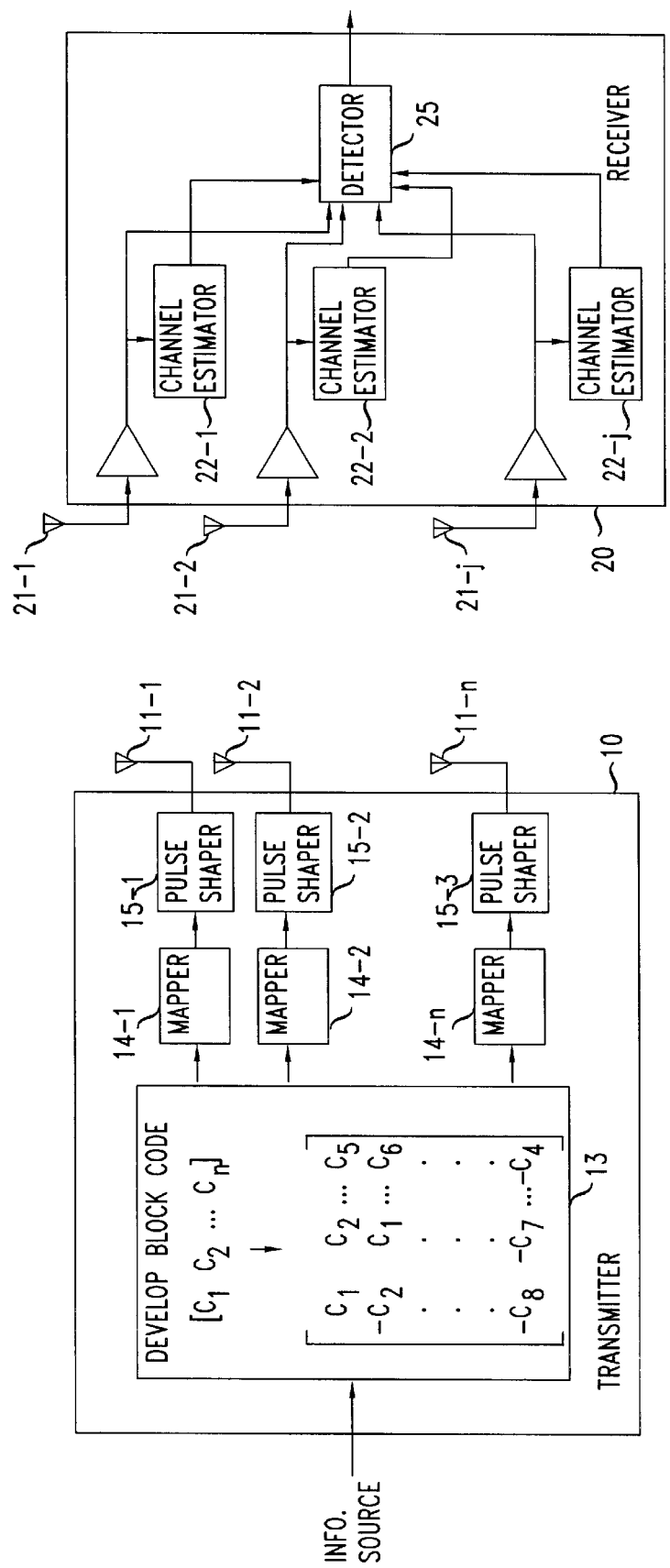
FIG. 1 is a block diagram of a transmitter having n antennas and a receiver having j antenna, where the transmitter and the receiver operate in accordance with the principles disclosed herein.

FIG. 1 presents a block diagram of an arrangement with a transmitter having n transmitter antenna an a receiver with j receiving antenna. When n=2, FIG. 1 degenerates to FIG. 1 of the aforementioned 09/074,224 Alamouti et al application. In that application an applied sequence of symbols $c_1$, $c_2$, $c_3$, $c_4$, $c_5$, $c_6$ at the input of transmitter 10 results in the following sequence being sent by antennas 11 and 12.

| Time: | t | t + T | t + 2T | t + 3T | t + 4T | t + 5T | |
|---|---|---|---|---|---|---|---|
| Antenna 11 | $c_0$ | $-c_1^*$ | $c_2$ | $-c_3^*$ | $c_4$ | $-c_5^*$ | ... |
| Antenna 12 | $c_1$ | $c_0^*$ | $c_3$ | $c_2^*$ | $c_5$ | $c_4^*$ | ... |

The transmission can be expressed by way of the matrix $$\begin{bmatrix} c_1 & c_2 \\ -c_2^* & c_1^* \end{bmatrix}, \quad (1)$$

where the columns represent antennas, and the rows represent time of transmission. The corresponding received signal (ignoring the noise) is:

| Time: | t | t + T | t + 2T | t + 3T |
|---|---|---|---|---|
| Antenna 11 | $h_1 c_1 + h_2 c_2$ | $-h_1 c_2^* + h_2 c_1^*$ | $h_1 c_3 + h_2 c_4$ | $-h_1 c_4^* + h_2 c_3^*$ ... | where $h_1$ is the channel coefficient from antenna 11 to antenna 21, and $h_2$ is the channel coefficient from antenna 12 to antenna 21, which can also be in the form $$\begin{bmatrix} r_1 \\ r_2^* \end{bmatrix} = \begin{bmatrix} h_1 & h_2 \\ h_2^* & -h_1^* \end{bmatrix} \begin{bmatrix} c_1 \\ c_2 \end{bmatrix}, \text{ or } r = Hc. \quad (2)$$

Extending this to n antennas at the base station and m antennas in the remote units, the signal $r_t^j$ represents the signal received at time t by antenna j, and it is given by $$r_t^j = \sum_{i=1}^{n} h_{ij} c_t^i + n_t^j \quad (3)$$

where $n_t^j$ is the noise at time t at receiver antenna j, and it is assumed to be a independent, zero mean, complex, Gaussian random variable. The average energy of the symbols transmitted by each of the n antennas is 1/n.

Assuming a perfect knowledge of the channel coefficients, $h_{ij}$, from transmit antenna i to receive antenna j, the receiver's decision metric is $$\sum_{t=1}^{l} \sum_{j=1}^{m} \left| r_t^j - \sum_{i=1}^{n} h_{ij} c_t^i \right|^2 \quad (4)$$

Over all codewords $c_1^1 c_1^2 \ldots c_1^n c_2^1 c_2^2 \ldots c_2^n \ldots c_1^1 c_1^2 \ldots c_1^n$ and decides in favor of the codeword that minimizes this sum.

For a constellation with real symbols, what is desired is a matrix of size n that is orthogonal, with intermediates $\pm c_1, \pm c_2, \ldots \pm C_n$. The existence problem for orthogonal designs is known in the mathematics literature as the Hurwitz-Radon problem, and was completely settled by Radon at the beginning of the 20$^{th}$ century. What has been shown is that an orthogonal design exists if and only if n=2, 4 or 8.

Indeed, such a matrix can be designed for the FIG. 1 system for n=2, 4 or 8, by employing, for example, the matrices $$\begin{bmatrix} c_1 & c_2 \\ -c_2 & c_1 \end{bmatrix}, \quad (5)$$

$$\begin{bmatrix} c_1 & c_2 & c_3 & c_4 \\ -c_2 & c_1 & -c_4 & c_3 \\ -c_3 & c_4 & c_1 & -c_2 \\ -c_4 & -c_3 & c_2 & c_1 \end{bmatrix} \text{ or} \quad (6)$$

-continued $$\begin{bmatrix} c_1 & c_2 & c_3 & c_4 & c_5 & c_6 & c_7 & c_8 \\ -c_2 & c_1 & c_4 & -c_3 & c_6 & -c_5 & -c_8 & c_7 \\ -c_3 & -c_4 & c_1 & c_2 & c_7 & c_8 & -c_5 & -c_6 \\ -c_4 & c_3 & -c_2 & c_1 & c_8 & -c_7 & c_6 & -c_5 \\ -c_5 & -c_6 & -c_7 & -c_8 & c_1 & c_2 & c_3 & c_4 \\ -c_6 & c_5 & -c_8 & c_7 & -c_2 & c_1 & -c_4 & c_3 \\ -c_7 & c_8 & c_5 & -c_6 & -c_3 & c_4 & c_1 & -c_2 \\ -c_8 & -c_7 & c_6 & c_5 & -c_4 & -c_3 & c_2 & c_1 \end{bmatrix}. \quad (7)$$

What that means, for example, is that when a transmitter employs 8 antennas, it accumulates a frame of 8 bits and, with the beginning of the next frame, in the first time interval, the 8 antennas transmit bits $c_1, c_2, c_3, c_4, c_5, c_6, c_7, c_8$ (the first row of symbols). During the second time interval, the 8 antennas transmit bits $-c_2, c_1, c_4, -c_3, c_6, -c_5, -c_8, c_7$ (the second row of symbols), etc.

A perusal of the above matrices reveals that the rows are mere permutations of the first row, with possible different signs. The permutations can be denoted by $\epsilon_k(p)$ such that $\epsilon_k(p) = q$ means that in row k, the symbol $c_p$ appears in column q. The different signs can be expressed by letting the sign of $c_i$ in the k-th row be denoted by $\delta_k(i)$.

It can be shown that minimizing the metric of equation (4) is equivalent to minimizing the following sum that $\epsilon_k(p) = q$ means that in row k, the symbol $c_p$ appears in column q. The different signs can be expressed by letting the sign of $c_i$ in the k-th row be denoted by $\delta_k(i)$.

It can be shown that minimizing the metric of equation (4) is equivalent to minimizing the following sum $$\sum_{i=1}^{n} \left( \left| \sum_{t=1}^{l} \sum_{j=1}^{m} r_t^j h_{\epsilon_t(i),j}^* \delta_t(i) - c_i \right|^2 + \left( -1 + \sum |h_{i,j}|^2 \right) |c_i|^2 \right) \quad (8)$$

Since the term $$\left| \sum_{t=1}^{l} \sum_{j=1}^{m} r_t^j h_{\epsilon_t(i),j}^* \delta_t(i) - c_i \right| + \left( -1 + \sum |h_{i,j}|^2 \right) |c_i|^2$$

only depends on $c_i$, on the channel coefficients, and on the permutations and signs of the matrix, it follows that minimizing the outer sum (over the summing index i) amounts to minimizing each of the terms for $1 \leq i \leq n$. Thus, the maximum likelihood detection rule is to form the decision variable $$R_i = \sum_{i=1}^{n} \sum_{j=1}^{m} r_t^j h_{\epsilon_t(i),j}^* \delta_t(i) \quad (9)$$

for all transmitting antennas, i=1,2, ... n, and decide in favor of is made in favor of symbol $c_i$ from among all constellation symbols if $$c_i = \arg \min_{c} |R_i - c|^2 + \left( -1 + \sum |h_{i,j}|^2 \right) |c|^2. \quad (10)$$

This is a very simple decoding strategy that provides diversity.

There are two attractions in providing transmit diversity via orthogonal designs.

There is no loss in bandwidth, in the sense that orthogonal designs provide the maximum possible transmission rate at full diversity.

There is an extremely simple maximum likelihood decoding algorithm which only uses linear combining at the receiver. The simplicity of the algorithm comes from the orthogonality of the columns of the orthogonal design.

The above properties are preserved even if linear processing at the transmitter is allowed. Therefore, in accordance with the principles disclosed herein, the definition of orthogonal arrays is relaxed to allow linear processing at the transmitter. Signals transmitted from different antennas will now be linear combinations of constellation symbols.

$$B_i^T B_i = I$$
$$B_i^T = -B_i, i=1,2, \ldots k \quad (11)$$
$$B_i B_j = -B_j B_i, 1 \leq i < j \leq k.$$

It has been shown by Radon that when $n = 2^a b$, where b is odd and $a = 4c + d$ with $0 \leq d < 4$ and $0 \leq c$, then and Hurwitz-Radon family of n×n matrices contains less than $\rho(n) = 8c + 2^d \leq n$ matrices (the maximum number of member in the family is $\rho(n)-1$). A Hurwitz-Radon family that contains n−1 matrices exists if and only if n=2, 4, or 8.

Definition: Let A be a p×q matrix with terms $a_{ij}$, and let B be any arbitrary matrix. The tensor product A⊗B is given by $$\begin{bmatrix} a_{11}B & a_{12}B & \cdots & a_{1q}B \\ a_{21}B & a_{22}B & \cdots & a_{2q}B \\ \vdots & \vdots & \ddots & \vdots \\ a_{p1}B & a_{p2}B & \cdots & a_{pq}B \end{bmatrix}. \quad (12)$$

Lemma: For any n there exists a Hurwitz-Radon family of matrices of size $\rho(n)-1$ whose members are integer matrices in the set $\{-1, 0, 1\}$.

Proof: The proof is by explicit construction. Let $I_b$ denote the identity matrix of size b. We first notice that if $n = 2^a b$ with b odd, then since $\rho(n)$ is independent of b ($\rho(n) = 8c + 2^d$) it follows that $\rho(n) = \rho(2^a)$. Moreover, given a family of $2^a \times 2^a$ Hurwitz-Radon integer matrices $\{A_1, A_2, \ldots A_k\}$ of size $s = \rho(2^a)-1$, the set $\{A_1 \otimes I_b, A_2 \otimes I_b, \ldots A_k \otimes I_b\}$ is a Hurwitz-Radon family of n×n integer matrices of size $\rho(n)-1$. In light of this observation, it suffices to prove the lemma for $n = 2^a$. To this end, we may choose a set of Hurwitz-Radon matrices, such as $$R = \begin{bmatrix} 0 & 1 \\ -1 & 0 \end{bmatrix}, \quad (13)$$

$$P = \begin{bmatrix} 0 & 1 \\ 1 & 0 \end{bmatrix}, \text{ and} \quad (14)$$

$$Q = \begin{bmatrix} 1 & 0 \\ 0 & -1 \end{bmatrix}, \quad (15)$$

and let $n_1 = s^{4s+3}$, $n_2 = s^{4s+4}$, $n_3 = s^{4s+5}$, $n_4 = s^{4s+6}$, and $n_5 = s^{4+7}$. Then, $$\rho(n_2) = \rho(n_1) + 1$$
$$\rho(n_3) = \rho(n_1) + 2$$
$$\rho(n_4) = \rho(n_1) + 4 \quad (16)$$
$$\rho(n_5) = \rho(n_1) + 8.$$

One can observe that matrix R is a Hurwitz-Radon integer family of size $\rho(2)-1$, $\{R \otimes I_2, P \otimes I_2, \ldots Q \otimes I_2\}$ is a Hurwitz-Radon integer family of size $\rho(2^2)-1$, and $\{I_2 \otimes R \otimes I_2, I_2 \otimes P \otimes R, Q \otimes Q \otimes R, P \otimes Q \otimes R, R \otimes P \otimes Q, R \otimes P \otimes P, R \otimes Q \otimes I_2\}$ is an integer Hurwitz-Radon family of size $\rho(2^3)-1$. Extending from the above, one can easily verify that if $\{A_1, A_2, \ldots A_k\}$ is an integer Hurwitz-Radon family of n×n matrices, then $$\{R \otimes I_n\} \cup \{Q \otimes A_i, i=1,2,\ldots,s\} \quad (17)$$

is an integer Hurwitz-Radon family of s+1 integer matrices (2n×2n).

If, in addition, $\{L_1, L_2, \ldots L_m\}$ is an integer Hurwitz-Radon family of k×k matrices, then $$\{P(x)I_k \otimes A_i, i=1,2,\ldots,s\} \cup \{Q(x)L_j \otimes I_n, j=1,2,\ldots,j\} \cup \{R(x)I_{nk}\} \quad (18)$$

is an integer Hurewitz-Radon family of s+m+1 integer matrices (2nk×2nk).

With a family of integer Hurwitz-Radon matrices with size $\rho(2^3)-1$ constructed for $n=2^3$, with entries in the set $\{-1, 0, 1\}$, equation (17) gives the transition from $n_1$ to $n_2$. By using (18) and letting $k=n_1$ and $n=2$, we get the transition from $n_1$ to $n_3$. Similarly, with $k=n_1$ and $n=4$ we get the transition from $n_1$ to $n_3$ and with $k=n_1$ and $n=8$ we get the transition from $n_1$ to $n_5$.

The simple maximum likelihood decoding algorithm described above is achieved because of the orthogonality of columns of the design matrix. Thus, a more generalized definition of orthogonal design may be tolerated. Not only does this create new and simple transmission schemes for any number of transmit antennas, but also generalizes the Hurwitz-Radon theory to non-square matrices.

Definition: A generalized orthogonal design G of size n is a p×n matrix with entries $0, \pm x_1, \pm x_2, \ldots, \pm x_k$ such that $G^T G = D$ is a diagonal matrix with diagonal $D_{ij}$, $i=1,2,\ldots,n$ of the form $(l_1^i x_1^2 + l_2^i x_2^2 + \ldots + l_k^i x_k^2)$. The coefficients $l_1^i, l_2^i, \ldots, l_k^i$, are positive integers. The rate of G is $R=k/p$.

Theorem: A p×n generalized orthogonal design $\epsilon$ in variables $x_1, x_2, \ldots x_k$ exists if and only if there exists a generalized orthogonal design G in the same variables and of the same size such that $G^T G = (x_1^2 + x_1^2 + \ldots x_k^2)I$.

In view of the above theorem, without loss of generality, one can assume that any p×n generalized orthogonal design G in variable $x_1, x_2, \ldots x_k$ satisfies $$G^T G = (x_1^2 + x_1^2 + \ldots x_k^2)I.$$

The above derivations can be employed for transmitting signals from n antennas using a generalized orthogonal design.

Considering a constellation A of size $2^b$, a throughput of kb/p can be achieved. At time slot 1, kb bits arrive at the encoder, which selects constellation symbols $c_1, c_2, \ldots c_n$. The encoder populates the matrix by setting $x_i = c_i$, and at times $t=1,2,\ldots,p$ the signals $G_{t1}, G_{t2}, \ldots G_{tn}$ are transmitted simultaneously from antennas $1, 2, \ldots, n$. That is the transmission matrix design is $$G = \begin{bmatrix} G_{11} & G_{12} & \cdots & G_{1n} \\ G_{21} & G_{22} & \cdots & G_{2n} \\ \vdots & \vdots & \ddots & \vdots \\ G_{p1} & G_{p2} & \cdots & G_{pn} \end{bmatrix}. \quad (19)$$

Thus, kb bits are sent during each frame of p transmissions. It can be shown that the diversity order is nm. The theory of space-time coding says that for a diversity order of nm, it is possible to transmit b bits per time slot, and this is the best possible. Therefore, the rate R is defined for this coding scheme is kb/pb, or k/p.

The following presents an approach for constructing high rate linear processing designs with low decoding complexity and full diversity order. It is deemed advantageous to take transmitter memory into account, and that means that given the rate, R, and the number of transmitting antennas, n, it is advantageous to minimize the number of time slots in a frame, p.

Definition: For a given pair (R,n), A(R,n) is the minimum number p such that there exists a p×n generalized design with rate at least. If no such design exists, then $A(R,n)=\infty$.

The value of A(R,n) is the fundamental question of generalized design theory. The most interesting part of this question is the computation of A(1,n) since the generalized designes of full rate are bandwidth efficient. To address the question the following construction is offered.

Construction I: Let $X=(x_1, x_2, \ldots, x_p)$ and $n \leq \rho(p)$. In the discussion above, a family of integer p×p matrices with $\rho(p)-1$ with members $\{A_1, A_2, \ldots A_{\rho(p)-1}\}$ was constructed (Lemma following equation 12). That is, the members $A_i$ are in the set $\{-1,0,1\}$. Let $A_0 = I$ and consider the p×n matrix G whose j-th column is $A_{j-1} X^T$ for $j=1,2,\ldots,n$. The Hurwitz-Radon conditions imply that G is a generalized orthogonal design of full rate.

From the above, a number of facts can be ascertained:

The value A(1,n) is the smaller number p such that $n \leq \rho(p)$.

The value of A(1,n) is a power of 2 for any $n \geq 2$.

The value $A(1,n) = \min(2^{4c+d})$ where the minimization is taken over the set $\{c,d | 0 \leq c, 0 \leq d < 4 \text{ and } 8c + 2^d \geq n\}$.

A(1,2)=2, A(1,3)=A(1,4)=4, and A(1,n)=8 for $5 \leq n \leq 8$.

Orthogonal designs are delay optical for n=2,4, and 8.

For any R, $A(R,n) < \infty$.

The above explicitly constructs a Hurwitz-Radon family of matrices of size p with $\rho(p)$ members such that all the matrices in the family have entries in the set $\{-1,0,1\}$. Having such a family of Hurwitz-Radon matrices of size $p=A(1,n)$, we can apply Construction I to provide a p×n generalized orthogonal design with full rate.

This full rate generalized orthogonal design has entries of the form $\pm c_1, \pm c_2, \ldots, \pm c_p$. Thus, for a transmitter having $n \leq 8$ transmit antennas the following optimal generalized designs of rate one are:

$$\mathcal{G}_3 = \begin{bmatrix} c_1 & c_2 & c_3 \\ -c_2 & c_1 & -c_4 \\ -c_3 & c_4 & c_1 \\ -c_4 & -c_3 & c_2 \end{bmatrix}, \quad (21)$$

$$\mathcal{G}_5 = \begin{bmatrix} c_1 & c_2 & c_3 & c_4 & c_5 \\ -c_2 & c_1 & c_4 & -c_3 & c_6 \\ -c_3 & -c_4 & c_1 & c_2 & c_7 \\ -c_4 & c_3 & -c_2 & c_1 & c_8 \\ -c_5 & -c_6 & -c_7 & -c_8 & c_1 \\ -c_6 & c_5 & -c_8 & c_7 & -c_2 \\ -c_7 & c_8 & c_5 & -c_6 & -c_3 \\ -c_8 & -c_7 & c_6 & c_5 & -c_4 \end{bmatrix}, \quad (22)$$

$$\mathcal{G}_6 = \begin{bmatrix} c_1 & c_2 & c_3 & c_4 & c_5 & c_6 \\ -c_2 & c_1 & c_4 & -c_3 & c_6 & -c_5 \\ -c_3 & -c_4 & c_1 & c_2 & c_7 & c_8 \\ -c_4 & c_3 & -c_2 & c_1 & c_8 & -c_7 \\ -c_5 & -c_6 & -c_7 & -c_8 & c_1 & c_2 \\ -c_6 & c_5 & -c_8 & c_7 & -c_2 & c_1 \\ -c_7 & c_8 & c_5 & -c_6 & -c_3 & c_4 \\ -c_8 & -c_7 & c_6 & c_5 & -c_4 & -c_3 \end{bmatrix}, \text{ and} \quad (23)$$

$$G_7 = \begin{bmatrix} c_1 & c_2 & c_3 & c_4 & c_5 & c_6 & c_7 \\ -c_2 & c_1 & c_4 & -c_3 & c_6 & -c_5 & -c_8 \\ -c_3 & -c_4 & c_1 & c_2 & c_7 & c_8 & -c_5 \\ -c_4 & c_3 & -c_2 & c_1 & c_8 & -c_7 & c_6 \\ -c_5 & -c_6 & -c_7 & -c_8 & c_1 & c_2 & c_3 \\ -c_6 & c_5 & -c_8 & c_7 & -c_2 & c_1 & -c_4 \\ -c_7 & c_8 & c_5 & -c_6 & -c_3 & c_4 & c_1 \\ -c_8 & -c_7 & c_6 & c_5 & -c_4 & -c_3 & c_2 \end{bmatrix}. \quad (24)$$

The simple transmit diversity schemes disclosed above are for a real signal constellation. A design for a complex constellation is also possible. A complex orthogonal design of size n that is contemplated here is a unitary matrix whose entries are indeterminates $\pm c_1, \pm c_2, \ldots, \pm c_n$, their complex conjugates $\pm c_1^*, \pm c_2^*, \ldots, \pm c_n^*$, or these indeterminates multiplied by $\pm i$, where $i=\sqrt{-1}$. Without loss of generality, we may select the first row to be $c_1, c_2, \ldots, c_n$.

It can be shown that half rate (R=0.5) complex generalized orthogonal designs exist. They can be constructed by creating a design as described above for real symbols, and repeat the rows, except that each symbol is replaced by its complex conjugate. Stated more formally, given that a design needs to be realized for complex symbols, we can replace each complex variable $c_i = c_i + ic_i$, where $i=\sqrt{-1}$, by the 2×2 real matrix $$\begin{bmatrix} c_i & c_i \\ -c_i & c_i \end{bmatrix}. \text{ In this way, } c_i^* = \begin{bmatrix} c_i & -c_i \\ c_i & c_i \end{bmatrix} \text{ and } ic_i = \begin{bmatrix} -c_i & c_i \\ -c_i & -c_i \end{bmatrix}.$$

It is easy to see that a matrix formed in this way is a real orthogonal design. The following presents half rate codes for transmission using three and four transmit antennas by, of course, an extension to any number of transmitting antennas follows directly from application of the principles disclosed above.

$$\mathcal{G}_c^3 = \begin{bmatrix} c_1 & c_2 & c_3 \\ -c_2 & c_1 & -c_4 \\ -c_3 & c_4 & c_1 \\ -c_4 & -c_3 & c_2 \\ c_1^* & c_2^* & c_3^* \\ -c_2^* & c_1^* & -c_4^* \\ -c_3^* & c_4^* & c_1^* \\ -c_4^* & -c_3^* & c_2^* \end{bmatrix}, \quad (25)$$

$$\mathcal{G}_c^4 = \begin{bmatrix} c_1 & c_2 & c_3 & c_4 \\ -c_2 & c_1 & -c_4 & c_3 \\ -c_3 & c_4 & c_1 & -c_2 \\ -c_4 & -c_3 & c_2 & c_1 \\ c_1^* & c_2^* & c_3^* & c_4^* \\ -c_2^* & c_1^* & -c_4^* & c_3^* \\ -c_3^* & c_4^* & c_1^* & -c_2^* \\ -c_4^* & -c_3^* & c_2^* & c_1^* \end{bmatrix}. \quad (26)$$

These transmission schemes and their analogs for higher values of n not only give full diversity but give 3 dB extra coding gain over the uncoded, but they lose half of the theoretical bandwidth efficiency.

Some designs are available that provide a rate that is higher than 0.5. The following presents designs for rate 0.75 for n=3 and n=4.

$$\begin{bmatrix} c_1 & c_2 & \frac{c_3}{\sqrt{2}} \\ -c_2^* & c_1^* & \frac{c_3}{\sqrt{2}} \\ \frac{c_3^*}{\sqrt{2}} & \frac{c_3^*}{\sqrt{2}} & \frac{(-c_1 - c_1^* + c_2 - c_2^*)}{2} \\ \frac{c_3^*}{\sqrt{2}} & \frac{-c_3^*}{\sqrt{2}} & \frac{(c_2 + c_2^* + c_1 - c_1^*)}{2} \end{bmatrix} \text{ and} \quad (27)$$

$$\begin{bmatrix} c_1 & c_2 & \frac{c_3}{\sqrt{2}} & \frac{c_3}{\sqrt{2}} \\ -c_2^* & c_1^* & \frac{c_3}{\sqrt{2}} & \frac{-c_3}{\sqrt{2}} \\ \frac{c_3^*}{\sqrt{2}} & \frac{c_3^*}{\sqrt{2}} & \frac{(-c_1 - c_1^* + c_2 - c_2^*)}{2} & \frac{(-c_2 - c_2^* + c_1 - c_1^*)}{2} \\ \frac{c_3^*}{\sqrt{2}} & \frac{-c_3^*}{\sqrt{2}} & \frac{(c_2 + c_2^* + c_1 - c_1^*)}{2} & \frac{(c_1 + c_1^* + c_2 - c_2^*)}{2} \end{bmatrix}. \quad (28)$$

We claim:

1. A transmitter responsive to a stream of symbols comprising:

n antennas, where n≧2; and an encoder for delivering p sets of n symbols to said n antennas, to be transmitted in p time intervals, where p>n, symbols delivered to each antenna in said p time intervals form temporal sets, and said temporal sets are orthogonal to each other.

2. The transmitter of claim 1 where p is expressible by $p=b \cdot 2^{4c+d}$, b being an odd integer, $0 \leq d < 4$ and $0 \leq c$, and p is such that $8c+2^d \geq n$.

3. The transmitter of claim 1 further comprising a buffer for storing at least n symbols.

4. The transmitter of claim 1 where the symbols are real.

5. The transmitter of claim 1 where the sets of symbols are permutations of each other, with selected sign reversals.

6. A transmitter responsive to a stream of symbols comprising:

n antennas; and an encoder for delivering p sets of n symbols to said n antennas, to be transmitted in p time intervals, where p is expressible by $p=b \cdot 2^{4c+d}$, where b is an odd integer, $0 \leq d < 4$ and $0 \leq c$, and p is such that $8c+2^d \geq n$.

7. The transmitter of claim 6 where symbols delivered to each antenna in said p time intervals form temporal sets, and said temporal sets are orthogonal to each other.

8. The transmitter of claim 6 further comprising a buffer for storing at least n symbols.

9. The transmitter of claim 6 where the symbols are real.

10. The transmitter of claim 6 where the sets of symbols are permutations of each other, with selected sign reversals.

11. A transmitter responsive to a stream of complex symbols comprising:

n antennas; and an encoder for delivering 2p sets of n symbols to said n antennas, to be transmitted in 2p time intervals, where p is expressible by $p=b \cdot 2^{4c+d}$, where b is an odd integer, $0 \leq d < 4$ and $0 \leq c$, and where p is such that $8c+2^d \geq n$.

12. The transmitter of claim 11 where p of the sets of symbols are permutations of the symbols, with selected sign reversals, and remaining p of the sets of symbols are repeats of the permutations and of the selected sign reversals, but with the symbols replaced by their respective complex conjugates.

13. The transmitter of claim 11 where symbols delivered to each antenna in said 2p time intervals form temporal sets, and said temporal sets are orthogonal to each other.

14. The transmitter of claim 1 where the p sets of n symbols, when viewed as a matrix, form a matrix of p rows and n columns of symbols c, the form $$\begin{bmatrix} c_1 & c_2 & c_3 \\ -c_2 & c_1 & -c_4 \\ -c_3 & c_4 & c_1 \\ -c_4 & -c_3 & c_2 \end{bmatrix}.$$

15. The transmitter of claim 1 where the p sets of n symbols, when viewed as a matrix, form a matrix of p rows and n columns of symbols c, the form $$\begin{bmatrix} c_1 & c_2 & c_3 & c_4 & c_5 \\ -c_2 & c_1 & c_4 & -c_3 & c_6 \\ -c_3 & -c_4 & c_1 & c_2 & c_7 \\ -c_4 & c_3 & -c_2 & c_1 & c_8 \\ -c_5 & -c_6 & -c_7 & -c_8 & c_1 \\ -c_6 & c_5 & -c_8 & c_7 & -c_2 \\ -c_7 & c_8 & c_5 & -c_6 & -c_3 \\ -c_8 & -c_7 & c_6 & c_5 & -c_4 \end{bmatrix}.$$

16. The transmitter of claim 1 where the p sets of n symbols, when viewed as a matrix, form a matrix of p rows and n columns of symbols c, the form $$G_6 = \begin{bmatrix} c_1 & c_2 & c_3 & c_4 & c_5 & c_6 \\ -c_2 & c_1 & c_4 & -c_3 & c_6 & -c_5 \\ -c_3 & -c_4 & c_1 & c_2 & c_7 & c_8 \\ -c_4 & c_3 & -c_2 & c_1 & c_8 & -c_7 \\ -c_5 & -c_6 & -c_7 & -c_8 & c_1 & c_2 \\ -c_6 & c_5 & -c_8 & c_7 & -c_2 & c_1 \\ -c_7 & c_8 & c_5 & -c_6 & -c_3 & c_4 \\ -c_8 & -c_7 & c_6 & c_5 & -c_4 & -c_3 \end{bmatrix}.$$

17. The transmitter of claim 1 where the p sets of n symbols, when viewed as a matrix, form a matrix of p rows and n columns of symbols c, the form $$G_7 = \begin{bmatrix} c_1 & c_2 & c_3 & c_4 & c_5 & c_6 & c_7 \\ -c_2 & c_1 & c_4 & -c_3 & c_6 & -c_5 & -c_8 \\ -c_3 & -c_4 & c_1 & c_2 & c_7 & c_8 & -c_5 \\ -c_4 & c_3 & -c_2 & c_1 & c_8 & -c_7 & c_6 \\ -c_5 & -c_6 & -c_7 & -c_8 & c_1 & c_2 & c_3 \\ -c_6 & c_5 & -c_8 & c_7 & -c_2 & c_1 & -c_4 \\ -c_7 & c_8 & c_5 & -c_6 & -c_3 & c_4 & c_1 \\ -c_8 & -c_7 & c_6 & c_5 & -c_4 & -c_3 & c_2 \end{bmatrix}.$$

18. The transmitter of claim 11 where the 2p sets of n symbols, when viewed as a matrix, form a matrix of 2p rows and n columns of symbols c, the form $$\begin{bmatrix} c_1 & c_2 & c_3 \\ -c_2 & c_1 & -c_4 \\ -c_3 & c_4 & c_1 \\ -c_4 & -c_3 & c_2 \\ c_1^* & c_2^* & c_3^* \\ -c_2^* & c_1^* & -c_4^* \\ -c_3^* & c_4^* & c_1^* \\ -c_4^* & -c_3^* & c_2^* \end{bmatrix}.$$

19. The transmitter of claim 11 where the 2p sets of n symbols, when viewed as a matrix, form a matrix of 2p rows and n columns of symbols c, the form $$G_c^4 = \begin{bmatrix} c_1 & c_2 & c_3 & c_4 \\ -c_2 & c_1 & -c_4 & c_3 \\ -c_3 & c_4 & c_1 & -c_2 \\ -c_4 & -c_3 & c_2 & c_1 \\ c_1^* & c_2^* & c_3^* & c_4^* \\ -c_2^* & c_1^* & -c_4^* & c_3^* \\ -c_3^* & c_4^* & c_1^* & -c_2^* \\ -c_4^* & -c_3^* & c_2^* & c_1^* \end{bmatrix}.$$

20. A transmitter responsive to a stream of complex symbols comprising:
three antennas; and
an encoder for delivering four sets of three symbols to said three antennas, to be transmitted in four time intervals, where the four sets of three symbols, when viewed as a matrix, form the matrix $$\begin{bmatrix} c_1 & c_2 & \frac{c_3}{\sqrt{2}} \\ -c_2^* & c_1^* & \frac{c_3}{\sqrt{2}} \\ \frac{c_3^*}{\sqrt{2}} & \frac{c_3^*}{\sqrt{2}} & \frac{(-c_1 - c_1^* + c_2 - c_2^*)}{2} \\ \frac{c_3^*}{\sqrt{2}} & \frac{-c_3^*}{\sqrt{2}} & \frac{(c_2 + c_2^* + c_1 - c_1^*)}{2} \end{bmatrix}.$$

21. A transmitter responsive to a stream of complex symbols comprising:
four antennas; and
an encoder for delivering four sets of four symbols to said three antennas, to be transmitted in four time intervals, where the four sets of four symbols, when viewed as a matrix, form the matrix $$\begin{bmatrix} c_1 & c_2 & \frac{c_3}{\sqrt{2}} & \frac{c_3}{\sqrt{2}} \\ -c_2^* & c_1^* & \frac{c_3}{\sqrt{2}} & \frac{-c_3}{\sqrt{2}} \\ \frac{c_3^*}{\sqrt{2}} & \frac{c_3^*}{\sqrt{2}} & \frac{(-c_1 - c_1^* + c_2 - c_2^*)}{2} & \frac{(-c_2 - c_2^* + c_1 - c_1^*)}{2} \\ \frac{c_3^*}{\sqrt{2}} & \frac{-c_3^*}{\sqrt{2}} & \frac{(c_2 + c_2^* + c_1 - c_1^*)}{2} & \frac{(c_1 + c_1^* + c_2 - c_2^*)}{2} \end{bmatrix}.$$

22. A transmitter comprising:

n antennas; and an encoder for delivering p sets of n symbols to said n antennas, to be transmitted in p time intervals, thus transmitting n sets of p symbols $c_1, c_2, \ldots c_p$ with a chosen set of respective signs, and where each of said n sets is constructed by forming a product $A_i c$, $i=1,2,\ldots,n$ and the set $A_i$'s is a set of Hurwitz-Radon matrices.

23. The transmitter of claim 22 where the set of $A_i$'s is constructed from tensor products of three Hurwitz-Radon 2×2 matrices.

24. The transmitter of claim 23 where the three 2×2 matrices are $$\begin{bmatrix} 0 & 1 \\ -1 & 0 \end{bmatrix}, \begin{bmatrix} 0 & 1 \\ 1 & 0 \end{bmatrix}, \text{ and } \begin{bmatrix} 1 & 0 \\ 0 & -1 \end{bmatrix}.$$

25. A transmitter comprising an encoder for encoding blocks of p symbols, where p is a power of 2, expressible by $p=2^{4c+d}$, where $0 \leq d < 4$ and $0 \leq c$, and n antennas for simultaneously transmitting a different one of said symbols over said n antennas, and means for transmitting said block of symbols in p time intervals, where $n \geq 2$, $p > n$, and n is such that $8c + 2^d \geq n$.

* * * * *